H. C. GREENWOOD.
SYNTHETIC PRODUCTION OF AMMONIA.
APPLICATION FILED FEB. 15, 1918.
1,329,397.
Patented Feb. 3, 1920.
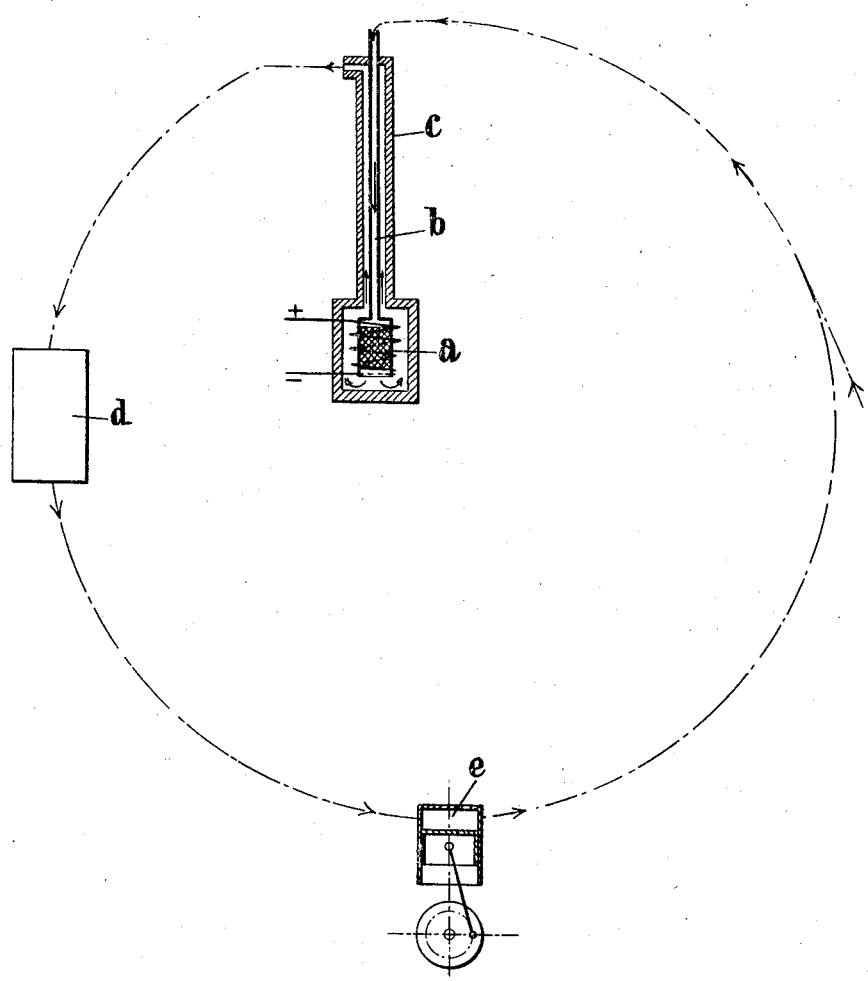
INVENTOR
H.C. Greenwood,
BY H. R. Kerslake
ATTORNEY

UNITED STATES PATENT OFFICE.

HAROLD CECIL GREENWOOD, OF PUTNEY, LONDON, ENGLAND.

SYNTHETIC PRODUCTION OF AMMONIA.

1,329,397.     Specification of Letters Patent.     Patented Feb. 3, 1920.

Application filed February 15, 1918. Serial No. 217,444.

*To all whom it may concern:*

Be it known that I, HAROLD CECIL GREENWOOD, D. Sc., a subject of the King of Great Britain and Ireland, and residing at 10 University Mansions, Putney, London, S. W., England, have invented certain new and useful Improvements in the Synthetic Production of Ammonia, of which the following is a specification.

This invention relates to the synthetic production of ammonia from a mixture containing hydrogen and nitrogen in the presence of a heated catalyst.

In such operations it is found advisable to preheat the reacting gases and this is sometimes done by causing the incoming gases to be heated at the expense of the issuing gases. This preheating is generally insufficient for raising the temperature of the incoming gases to that demanded by the conditions of the reaction, and the deficiency may be supplied by imparting heat to the system from some external source, for example, electrical heating coils.

According to my invention I preheat the gases before they pass to the reaction chamber by causing the same to flow through a coil or coils, tube or tubes, or other vessel or conduit which separates them from the issuing gases. The cross-sectional areas of the passages through which the incoming and outgoing gases pass are so adjusted that the velocities of the travel of the fluids therein are above the "critical velocities" whereby turbulent motion (instead of stream line motion) is set up. (Compare Stanton & Pannel, *Philosophical Transactions*, A. 214, p. 199, 1914).

In the volume of the *Philosophical Transactions* in question, the critical velocity is defined as follows:—

$$v_0 d / \sqrt{} = \text{constant}$$

or $$v_c = \frac{\text{constant} \times \sqrt{}}{d}$$

where $v_c$ is the critical (mean linear) velocity.

$d$ is the diameter.

$\sqrt{}$ is the "kinematical viscosity" of the fluid in question.

From data given in the same paper, it may be taken that the constant in the above expression is approximately equal to 2500 for any fluid when dealing with smooth circular tubes, and when using C. G. S. units; consequently, the expression gives at once the critical velocity in terms of this constant, the diameter of the tube and the "kinematical viscosity" (which is equal to the viscosity divided by the density), no preliminary experiment being required. All the data required are readily found in physico-chemical tables, and a table of suitable diameters and gas velocities is superfluous; further, the density of the gases must be taken to correspond with the particular gas pressure used in effecting the synthesis of ammonia; similarly, the value of $\sqrt{}$ must be taken for the actual temperature in question.

In consequence of this turbulent motion of the fluid the rate of transfer of heat across the separating partition between the two streams of gases is very high, whereas with stream line motion of the fluid it is very low. Thus it will be seen that by means of my invention a more efficient interchange of heat is effected between the incoming cooled gases and the outgoing hot gases, resulting in improved preheating and thus enabling a diminution to be effected in the amount of electrical energy required for supplying the additional heat as mentioned above.

I prefer that the velocities both of the incoming and outgoing gases should be above the critical velocities but obviously a considerable advantage is gained even if the velocity of one only of the streams of gas is above the critical velocity.

A further advantage is also obtained since the dimensions of the regenerator parts when operating in accordance with my invention may be made much smaller than would be necessary if working below the critical velocity of the gas or gas mixture.

It is not necessary for the velocity in all parts of the system (*e. g.* the catalyst chamber) to exceed the critical value as long as it is above this value in one or both directions through the heat interchanger parts.

I may employ my invention with great advantage whether the process for the production of ammonia be carried out at "high gas velocity" in the catalyst container as described in the specification to my co-pending application 217,443, filed Feb. 15, 1918, or whether the velocity in the catalyst container be comparatively low.

The accompanying drawing illustrates diagrammatically one form of apparatus in accordance with my invention, where $a$ is the electrically heated catalyst chamber to which the incoming gas obtains access through the tube $b$ which is surrounded by the outer tube $c$ through which the outgoing gases pass, the ammonia remover being indicated at $d$ and the pump at $e$. The dimensions of the tube $b$ are such that turbulent motion is set up in the incoming gases, whereby they are heated and heat is also imparted to them from the outgoing gases passing through the tube $c$.

As a specific example of the preferred conditions, the following is given, for purposes of illustration:—

|  | Temperature. | Pressure. |
|---|---|---|
| Catalyst chamber | 600° C. | About 148 atmospheres. |
| Inlet of $b$ | 20° C. | " 150 " |
| Outlet of $b$ | 550° C. | " 149 " |
| Inlet of $c$ | 600° C. | " 148 " |
| Outlet of $c$ | 70° C. | " 147 " |

*Diameters of tubes.*

$b$ Internal: 2 inches. External: 2¼ inches.
$c$ Internal: 3 inches.
Volume of gas passing through the tubes 100,000 cubic feet per hour, expressed as free hydrogen and nitrogen, measured at 20° C.

It will, however, be obvious that I may suitably modify the form, construction and arrangement of apparatus as may be found most suited to fulfil any particular practical requirements.

Having now described my invention, what I claim as new and desire to secure by Letters Patent is:—

1. In a process for the synthetic production of ammonia, preheating the incoming gases at the expense of the issuing gases by passing said gas streams through a heat interchanger, at least one of said streams flowing at a velocity above the critical velocity.

2. In a process for the synthetic production of ammonia, preheating the gases passing to the reaction chamber by passing the same through a tube at a velocity above the critical velocity and by causing the issuing gases to pass through a tube surrounding said first mentioned tube.

3. In a process for the synthetic production of ammonia, preheating the incoming gases at the expense of the issuing gases by passing both of said gas streams through a heat interchanger at a velocity above the critical velocity.

4. In a process for the synthetic production of ammonia preheating the incoming gases at the expense of the issuing gases by passing at least one of said gas streams through a heat interchanger at a velocity above the critical velocity and by supplying additional heat to the gases from an external source.

5. In the carrying out of gas reactions effected by a heated catalyzer, the step of preheating the incoming gases by the heat of the outgoing gases, by passing such gas streams through a heat interchanger, at least one of said gas streams passing through such heat interchanger at a velocity above the critical velocity.

In testimony whereof I have signed my name to this specification.

HAROLD CECIL GREENWOOD.